March 3, 1942.　　　F. P. LAWLER　　　2,275,390
GROUND WORKING ATTACHMENT FOR TRACTORS
Filed Aug. 14, 1939　　　5 Sheets-Sheet 1

FRANK P. LAWLER,
INVENTOR.
BY
ATTORNEY

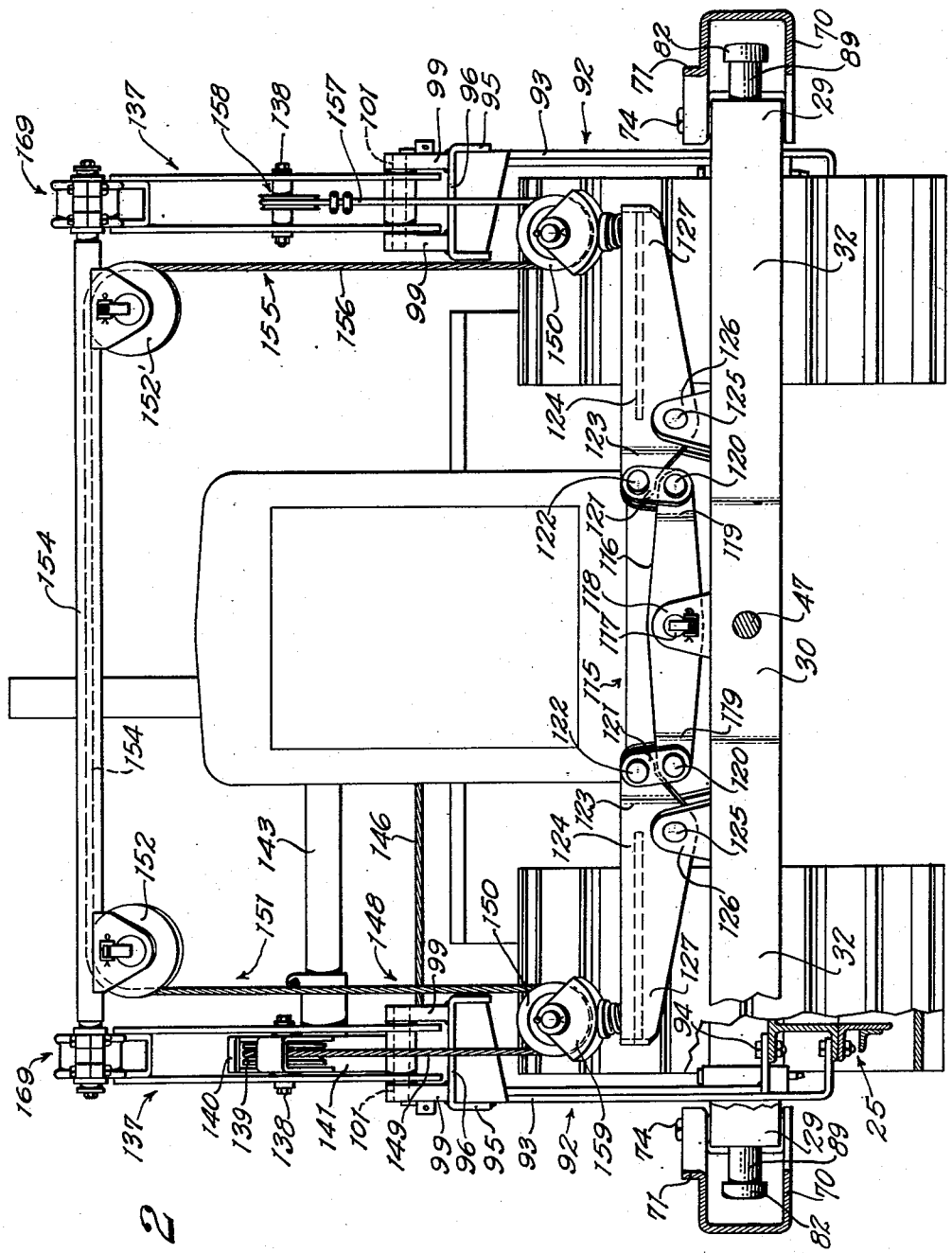

March 3, 1942. F. P. LAWLER 2,275,390
GROUND WORKING ATTACHMENT FOR TRACTORS
Filed Aug. 14, 1939 5 Sheets—Sheet 3
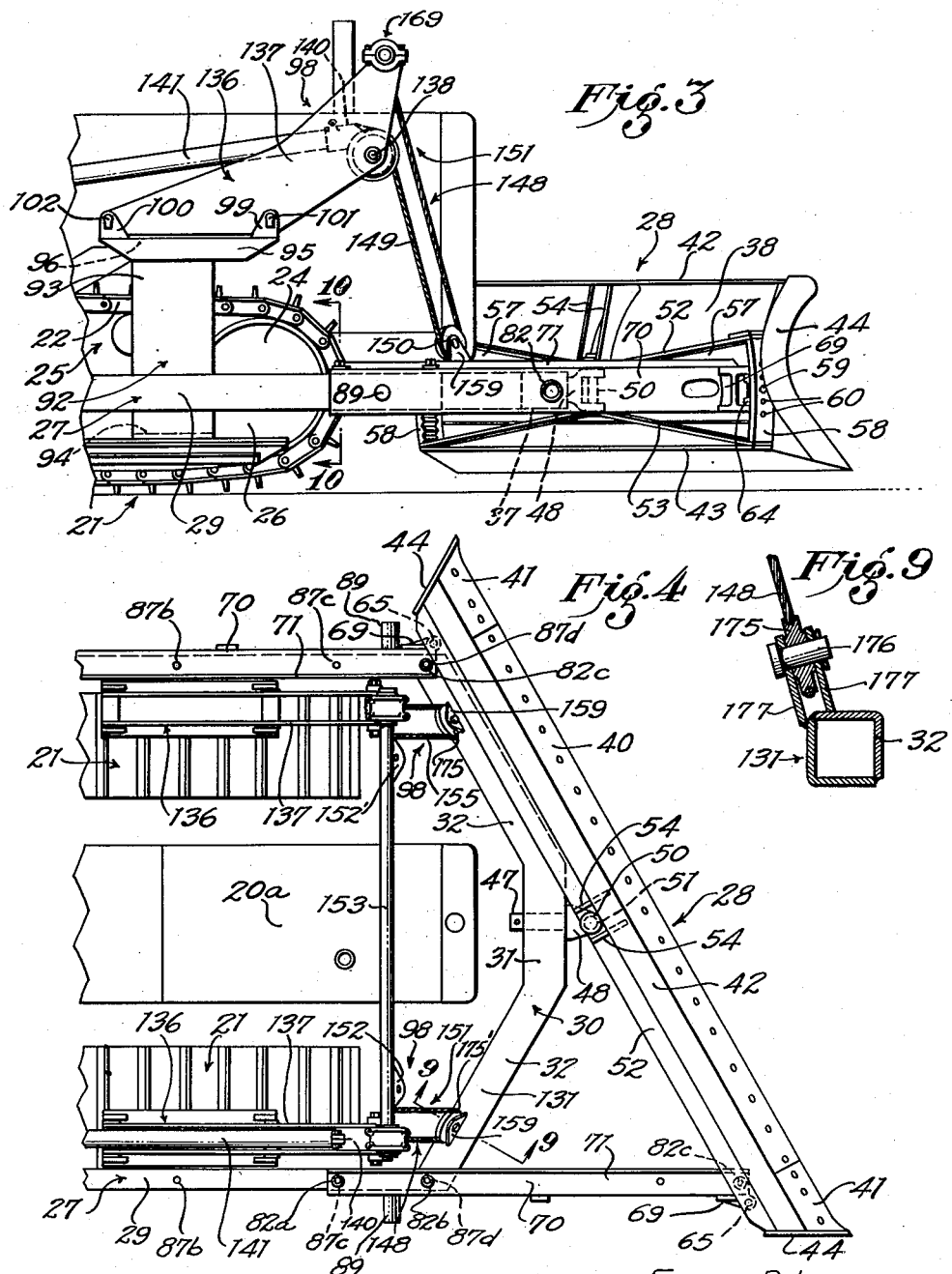
FRANK P. LAWLER, INVENTOR.
BY
ATTORNEY

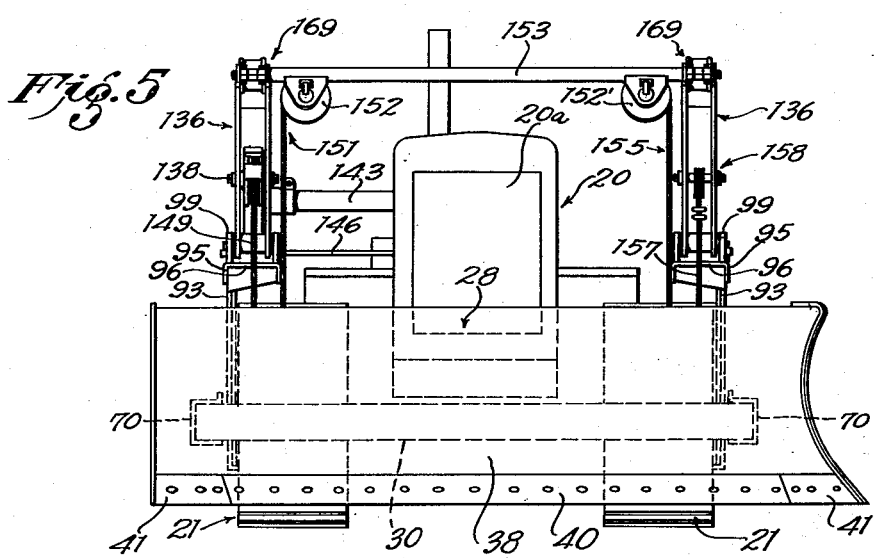
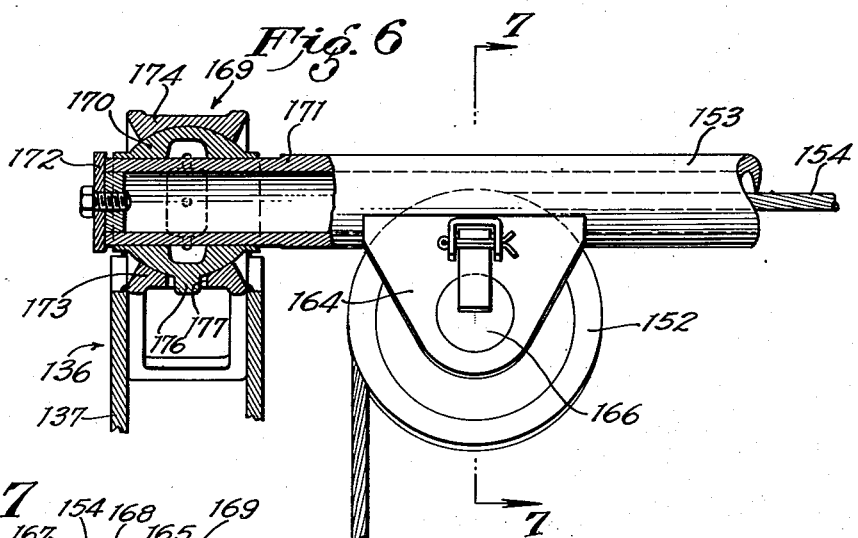
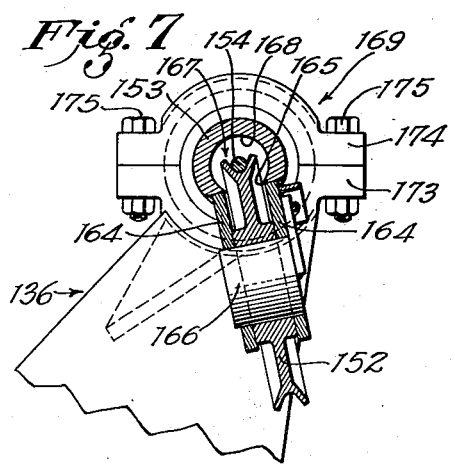

March 3, 1942.  F. P. LAWLER  2,275,390
GROUND WORKING ATTACHMENT FOR TRACTORS
Filed Aug. 14, 1939   5 Sheets-Sheet 5
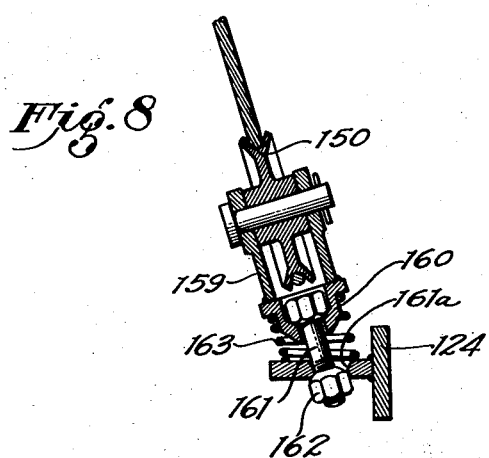
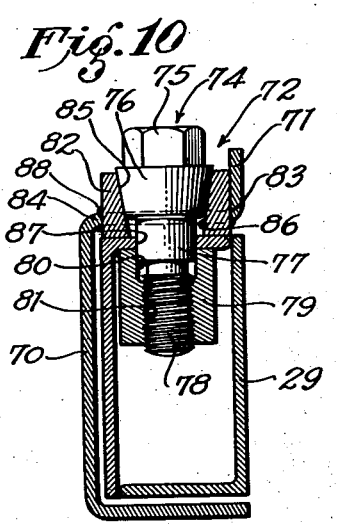
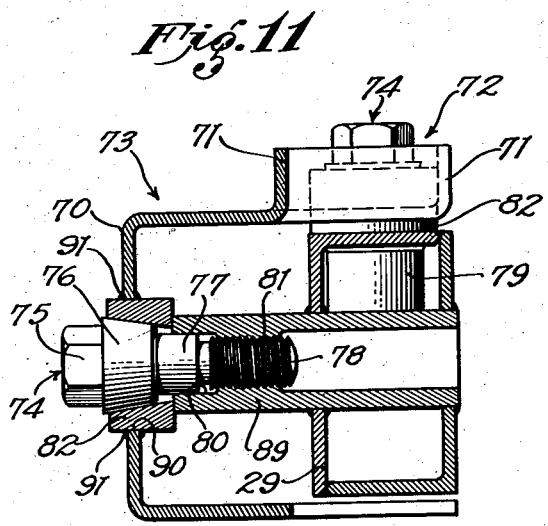
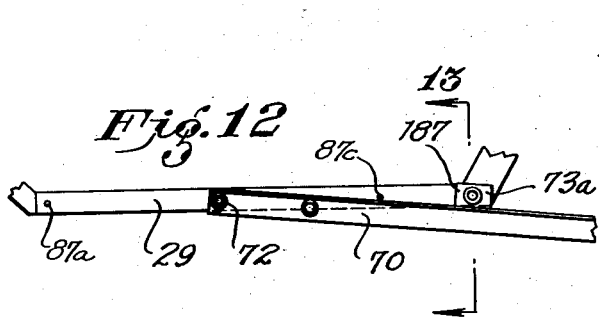
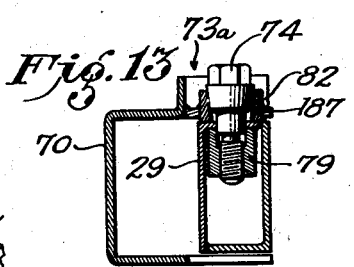
FRANK P. LAWLER,
INVENTOR.
BY
ATTORNEY Patented Mar. 3, 1942

2,275,390

UNITED STATES PATENT OFFICE 2,275,390

GROUND WORKING ATTACHMENT FOR TRACTORS

Frank P. Lawler, Huntington Park, Calif., assignor, by mesne assignments, to The Buckeye Traction Ditcher Company, Findlay, Ohio Application August 14, 1939, Serial No. 290,093

4 Claims. (Cl. 37—144)

My invention relates to devices of the general character of bulldozers or trail builders, and relates to a central form of attachment which may be readily applied to a tractor and which will support a ground engaging tool in selected positions of operation.

In devices of this general character a pusher blade or mold board is supported on the front portion of a tractor by means of a U-shaped frame having arms which extend rearward along the side of the tractor and connect to the tractor at a point near the rear end thereof. A lifting means is placed at or near the front end of the tractor to raise and lower the supporting member and the pusher blade which is secured thereto. It is found that where devices of this general character are applied to a tractor, full pushing efficiency of the tractor is difficult of attainment for the reason that the addition of the ground working equipment to the front portion of a tractor results in a complete device having a center of gravity positioned toward the front end of the tractor tread, the result being that excessive wear is imposed on the front rollers or bearings for the continuous chain treads forming the external moving part of the tread elements of a tractor.

An object of the present invention is to provide a tractor with ground working means projecting forwardly therefrom, which ground working means and its supporting parts are so proportioned and positioned that the resulting structure of a tractor and the attachment has a center of gravity shifted but little forward of the central transverse plane of the tractor tread element. This relieves the front end of the tread structure from excessive wear, and also makes it possible to obtain maximum traction or pushing effect from the tractor, for the reason that the tread chains are given maximum engagement with the surface of the ground.

A further object of the invention is to provide a ground working attachment for a tractor wherein separate supports are mounted on the two tread elements of the tractor so that the load or dead weight of the ground working attachment will be transmitted directly through the tread element to the ground, accordingly avoiding the application of strains or forces which might rupture any part of the tractor body. These supports move up and down as the tractor is propelled over uneven ground. It is a feature of this device to provide suspension or lift means for connecting the ground working elements to the support, the same having a simplified equalizing means which is substantially instantaneous in its action, and which will substantially equally divide the load of the ground working attachment between the treads of the tractor.

It is a further object of the invention to provide a tractor of the above character having an improved equalizing means comprised of a primary equalizer and a secondary equalizer, the primary equalizer being relatively slow in its action, and the secondary equalizer being connected in parallel to the primary equalizer and being substantially instantaneous in its equalizing action so that substantially full compensation for sudden changes in the positions of the tread elements will be attained.

A further object of the invention is to provide simple means for rigidly supporting the pusher blade or mold board of the tractor attachment in selected positions of operation.

It is a further object of the invention to provide an attachment for a tractor wherein a pusher blade is supported so that it may be tilted from a horizontal position to a pitched position, there being means for rigidly and positively securing the adjustable parts together in desired positions of operation.

A further object of the invention is to provide a simple and positive acting clamping means which may be employed to clamp together the adjustable parts of the device by which the ground working or pusher blade is rigidly held in operative position.

It is a further object of the invention to provide a clamping means having a rugged clamping screw with an enlarged head to securely engage a tapered seat formed in one of the parts to be secured together. This engagement of the head and the seat not only tightly clamps the parts together but also cooperates as a centralizing or positioning means whereby to move the cooperating parts of the device into their respective positions of operation. This feature of the invention contributes to ease and simplicity of adjusting the parts of the device to different positions of cooperation.

It is a further object of the invention to provide an attachment for a tractor of the above nature having a simple and effective cable operated means for controlling the raising and lowering movements of the ground engaging parts.

It is a further object of the invention to provide an attachment of the above character having lift means for supporting the ground engaging part and its supporting frame, wherein a cable equalizer and a mechanical equalizer are employed in parallel so that the load of the ground engaging member and its supporting frame will be constantly divided substantially equally between the two tread elements of the tractor.

It is a further object of the invention to provide a simple means for securing the lift or control element of the device to the independent supports which are mounted on the tread elements of the tractor, this simple attachment means making it possible to conveniently replace the cable lift or control means with other lift or control means, such as hydraulic type.

Further objects and advantages of the invention will be brought out in the following part of the specification.

Referring to the drawings which are for illustrative purposes only:

Fig. 2 is an enlarged cross-section taken substantially as indicated by the line 2—2 of Fig. 1.

Fig. 3 is a side elevation of the front portion of a tractor equipped with a form of my invention having a single equalizing means.

Fig. 4 is a fragmentary plan view corresponding to Fig. 3.

Fig. 5 is a sub-elevation corresponding to Fig. 3.

Fig. 6 is an enlarged fragmentary section taken as indicated by the line 6—6 of Fig. 1.

Fig. 7 is a cross-section taken from the line 7—7 of Fig. 6.

Fig. 8 is an enlarged fragmentary cross-section taken as indicated by the line 8—8 of Fig. 1 to show the means for attaching the sheaves to the mechanical equalizing means.

Fig. 9 is an enlarged fragmentary section taken as indicated by the line 9—9 of Fig. 4.

Fig. 10 is an enlarged section taken on a plane represented by the line 10—10 of Fig. 3 to show one of the clamping means of the invention.

Fig. 11 is an enlarged cross-section on a plane represented by the line 11—11 of Fig. 1.

Fig. 12 is a fragmentary plan view showing an alternative form of clamping means to be used when the pusher blade is in bulldozing position.

Fig. 13 is a cross-section on a plane indicated by the line 13—13 of Fig. 12.

Figure 1:
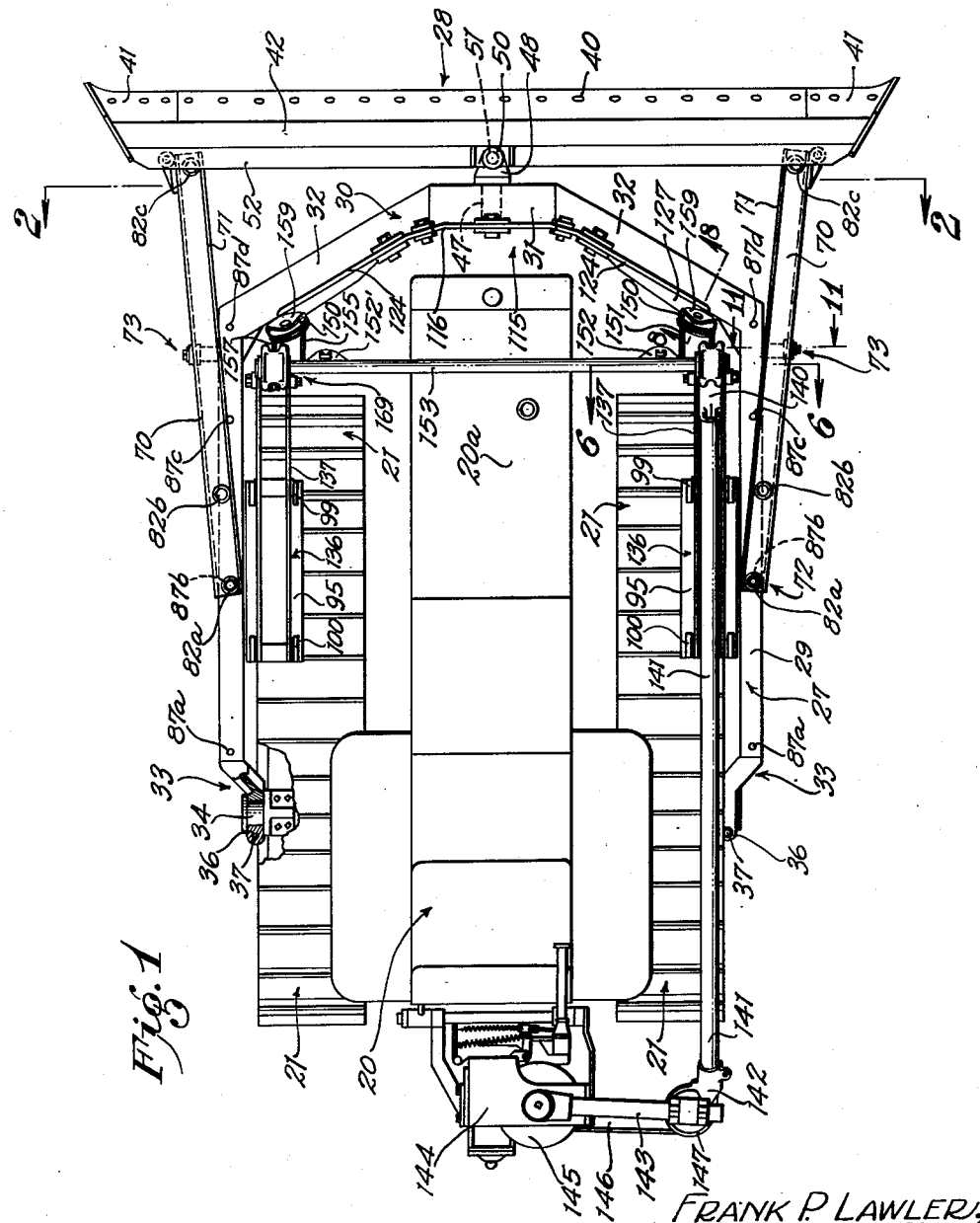
Fig. 1 is a plan view of a preferred form of my invention affixed to a tractor.

My present invention is especially adapted for use with a tractor 20 of the track laying type having tread elements 21 at the sides thereof, each tread element including a chain belt or linked element 22, and means for supporting and driving the chain belt 22 consisting of a drive sprocket (not shown) disposed at the rear end of a tractor and an idler wheel 24 spaced forwardly from the sprocket, there being an internal supporting structure 25 for the chain loop 22, which supporting structure is positioned within the chain loop and includes a horizontal beam 26. This tractor 20 includes an engine 20a at the forward end thereof, and suitable transmission, not shown, to deliver driving power through the sprocket to the chain belt 22 of the tread elements 21. As the tractor is propelled over uneven ground, the forward portions of the tread elements 21 swing up and down on the axes of the drive sprocket 23.

In my invention I employ a thrust member 27 which is of U-shaped form. On the front portion of this thrust member 27 a ground working member 28 is supported. In the general practice of the invention this ground working member 28 consists in a pusher blade or mold board which may be used in laterally extended position, as shown in Fig. 1, or in angled position, as shown in Fig. 4, this depending on whether the device is to be used for ordinary bulldozing operations or for trail building. The thrust member 27 has a pair of side arms 29, which extend along the sides of the tractor, as best shown in Fig. 1, and a cross member 30 rigidly secured to the front ends of the side arms 29 in a position ahead of but close to the forward end of the tractor 20. The cross-member 30 has a central portion 31 and a pair of rearwardly sloping portions 32 which connect to the front ends of the side arms. The side arms 29 extend back to points near the rearward ends of the tread elements 21 and carry fittings 33 by which the side arms are connected to pivots 34 comprising pins which project outwardly from the sides of the tread elements. These fittings 33 are of detachable type and employ removable blocks 36 which are secured in positions by vertical pins 37.

The pusher blade 28 is shaped so that as it is moved forward in the lowered position in which it is shown in Fig. 3, it will roll material ahead of it. This pusher blade 28 includes a curved plate 38 and a removably secured scraper knife 40, with corner bits 41 secured at the ends thereof. The upper edge of the plate 38 is bent rearwardly to form a horizontally flange 42, and a nearly horizontal bottom plate 43 is placed at the lower edge of the pusher blade 28, there being vertical end plates 44 at the ends of the plates 38 and 43, such end plates being preferably welded in place. As shown in Figs. 1, 3, and 4, a universal joint connects the central portion of the pusher blade 28 to the central portion 31 of the thrust member 27. This universal joint comprises a horizontal pin 47 which extends through the central portion 31 of the cross-member 30 and has a head 48 drilled to receive a substantially vertical pin 50 which is also passed through openings 51 in spaced plates 52 and 53 which are welded on the back of the plate 38 in a position above the bottom plate 43. In positions to straddle the head of the pin 50, vertical bracing plates 54 are welded to the back of the plate 38 in positions above the central portion of the plate 52. These plates 52 and 53 form ribs on the back of the pusher blade 28, these ribs diverging outwardly from the center towards the end of the pusher blade 28 and define channels 57 which increase in vertical dimension from the center of the pusher blade 28 towards the ends thereof. One form of adjustable connection between the pusher frame and mold board which I may employ consists of arcuate segments 58 secured in the outwardly flaring channels 57, such segments being curved on a radius having its center point in the axis defined by the horizontal pin 47, by means of a bolt 59, to be selectively passed through openings 60 in the segments 58. Connector bodies 64 may be secured to the segments 58 in such position as to secure the desired tilt or pitch of the blade from the horizontal position thereof shown in Fig. 3. Each connector body 64 carries a vertical hinge pin 65 on which a bracket 69 is swingable. Each of the brackets 69 is welded to the forward end of an extension 70. These extensions 70 are adjustable on the side arms 29 of the thrust member 27 so as to have different positions of forward extensions to carry the pusher blade 28 in lateral position, as shown in Fig. 1, or angled position, as shown in Fig. 4, and each extension 70 preferably comprises a channel bent from sheet steel, as best shown in Fig. 10, of a size to fit over a side arm 29. This channel has top and bottom walls which are stiffened by vertically projecting flanges 71.

The invention provides a simple and improved means for clamping the extension 70 in the desired position of forward projection, and in the preferred practice of the invention two different forms of this clamping means are employed, as shown at 72 and 73 of Fig. 1, and as further shown in Figs. 10 and 11. Each of these clamping means employs a screw 74 of essentially identical form so that the screws 74 may be used interchangeably. Each screw 74 has a head 75 with a downwardly converging conical face 76 coaxial with a cylindrical barrel 77 and a threaded stem 78. The clamping means 72 are vertically disposed; whereas, clamping means 73 are horizontally disposed, the clamping means 73 being used only when the pusher blade 28 is supported in laterally extended position, as shown in Fig. 1. The clamping means 72, however, are employed in all positions of the extension 70 on the side arms 29.

The clamping means 72 has a body 79 with an upper cylindrical bore 80 and a lower threaded bore 81, the bore 80 being of a size to make a relatively close working fit with the barrel 77 of the screw 74, and the threaded bore 81 receiving the threaded stem 78. A wall or collar 82 is welded into an opening 83 in the upper wall of the channel forming the extension 70, this collar 82 having a conical seat 85 to cooperate with the conical face 76 of the head 75. The opening 86 through the body 82 is materially larger than the opening 87 in the top of the side arm 29, this opening 87 being coaxial and communicating with the bore 80 of the body 79. The body 79 may be welded in place, as shown in Fig. 10.

A feature of the clamping means 72 is that alignment of the cooperating parts may be obtained in a simple manner during manufacture of the attachment. For example, with the threaded body 79 in place in the side arm 29, the collar 82 may be secured on the upper face of the side arm 29 by use of the clamping screw 74. The extension 70, with the opening 86 therein slightly oversize, may be placed in position, and the weld 88 may be applied as shown in Fig. 10 to secure the collar 82 in the extension in proper position.

As shown in Fig. 11, the clamping means 73 includes a sleeve 89 welded in the side arm 29 near the forward end thereof and in a position to project outwardly therefrom in a horizontal plane, this sleeve having in the outer end thereof a cylindrical bore 80, and a coaxial threaded bore 81. In assembling the cooperating parts of the clamping means 73, a collar or body 82 is secured against the outer end of the sleeve 89 by means of a clamping screw 74, and the extension 70 is then placed in intermediate position, as shown in Fig. 1, with the collar 82 projecting through an opening 90 in the side wall of the extension 70, after which the weld 91 is applied.

When an extension 70 is being adjusted into a desired position of projection, accurate alignment of the cooperating parts of the clamping means 72 and 73 is not necessary, for the reason that the opening 87, Fig. 10, and the cylindrical bore 80, Fig. 11, is smaller than the opening through the collar 82. All that is necessary is to have the extension 70 in such position that the screws 74 may be started in the respective cooperative openings. The tightening of the head 75 down into the conical seat 85 will pull the collars 82 into axial alignment with the threaded openings. The extension 70 will be positively pulled into place even though the same may have become slightly warped. An additional feature is that the threads of the bodies 79 and the sleeves 89 are concealed and protected, due to the fact that the threaded bores 81 are spaced from the end of the members 79 and 89. The engagement of the conical faces 76 of the screws with the conical seat 85 produces a frictional engagement which will positively lock the screws 74 in place.

An additional feature of the present invention is that each extension 70 is rigidly secured to its cooperating side arm 29 by a pair of securing means. When the pusher blade 28 is in lateral, or bulldozing position, as shown in Fig. 1, securing means 72 and 73 are employed in spaced position in each extension 70. When the pusher blade 28 is in this laterally extended position, the extensions 70 diverge so that when the rear end of each extension lies close to a side arm 29 an intermediate portion of the extension 70 will be spaced from the side arm, but the same will be rigidly connected to the forward portion of its cooperating side arm by the cooperation of a screw 74 with a sleeve 89. It will be noted that each side arm 29 has only one sleeve 89, but has in the top face thereof four openings 87, as indicated at 87a, 87b, 87c, and 87d, in Figs. 1 and 4, each of these openings 87 leading into a threaded body 79 of the character shown in Fig. 10. Each extension 70 has three of the collars 82 mounted in the upper wall thereof, as indicated at 82a, 82b, and 82c. When the pusher blade 28 is in bulldozing position, as shown in Fig. 1, screws 74 are passed through the collars 82 in the sides of the extensions 70 into the sleeves 89, and screws 74 are passed through the collars 82a at the rear ends of the extensions 70 into openings 87b. When the pusher blade 28 is in either of its angled positions, as shown in Fig. 4, for example, screws 74 will be passed through collars 82a and 82b into openings 87c and 87d, on one side of the tractor, and on the other side of the tractor screws 74 will be passed through collars 82a and 82c into openings 87a and 87d. A plurality of spaced openings are provided in the web of each extension 70, to accommodate the sleeves 89. In each instance the extensions 70 will be each rigidly secured by a pair of clamping means, and therefore the ends of the pusher blade 28 will be rigidly secured in operating position.

To adjustably support the front end of the thrust member 27 and its attached pusher blade 28, I provide supporting members 92 mounted independently on the tread elements 21, these supporting members having the function of transmitting the load of the forward portion of the attachment directly to the tread elements and thence to the ground, without placing harmful strains in the body castings of the tractor 20. It is a feature of the invention to provide a support, such as the support 92, of such character that a lift means, such as the cable lift means 98, or other lift means, may be detachably secured thereto. Accordingly, each support 92 is provided with a post member 93, the lower portion of which is bolted, as at 94, to the internal supporting structure 25 of the cooperating tread element. At the upper end of each post 93 there is a horizontal portion or member 95, preferably made from a channel placed with its flanges directed downward so that the web 96 thereof will form a substantially horizontal table to carry detachable securing means in spaced relation. The front securing means comprises a pair of spaced fins or lugs 99, to support a horizontal pin 101, and the rear securing means comprises a pair of spaced fins or lugs 100 to support a horizontal pin 102. The cable lift means 98 comprises pairs of plates 136 which are placed in spaced relation so as to form arms 137 which extend forwardly and upwardly. The pins 101 and 102 pass through the lower portions of the plates 136, thereby securing the same rigidly to the table portion 95 and the supporting members 92. Across the forward portion of each pair of plates 136, a shaft or bolt 138 is extended, and on one of these bolts 138, as shown in Figs. 2 and 3, a sheave 139 is mounted, and also on this shaft 138 a sheave casing 140 is mounted, there being a cable tube 141 extending rearwardly between plates 136 to the rear end of the tractor. A sheave casing 142, on the rear end of the tube 141 is pivotally connected to the outer end of an arm 143 which swingably extends from a cable winch 144, as shown in Fig. 1. The cable drum 145 of the winch 144, carries a cable 146 which extends around a sheave 147, supported in the casing 142, into the cable tube 141. The cable passes through the cable tube to the sheave 139 and a cable loop 148 is formed in depending relation to the sheave 139 by extending a portion 149 of the cable, as shown in Fig. 2, down under a sheave 150, and thence upward, as indicated at 151, to a sheave 152 mounted on a spreader member 153 which is preferably a tube. From the sheave 152 a lateral portion 154 of the cable extends to a second sheave 152' supported near the other end of the spreader member 153, and a depending loop 155 is formed by carrying a portion 156 of the cable downward from the sheave 152' under a second sheave 150, and then extending a portion 157 of the cable upward to be secured at 158 on the remaining lateral bolt 138. The sheaves 150 are each carried in a sheave casing 159, having a cylindrical projection 160, as shown in Fig. 8, a bolt 161 being extended down through this cylindrical projection 160 to pass through an opening 161a in the outer end 127 of a lever 124. A head 162 is secured on the lower end of the bolt 161 and a spring 163 is placed between the sheave casing 159 and the lever 124 to urge the casing 159 toward raised position so that the same will not rattle. The casing 159 may swing on the bolt 161 as required in the operation of the device.

As shown in Figs. 6 and 7, the sheaves 152 and 152' are carried between pairs of plates 164 which are welded to the tube 153, not including the center bar, on opposite sides of openings 165. Each sheave 152 or 152' is mounted on a pin 166 carried by the plates 164, this pin 166 being in such position that the sheave will be held so that the upper portion 167 thereof will project into the opening 168 of the tube 153. The sheaves 152 and 152' direct the lateral extension 154 of the cable in and out of the axial opening 158 of the tube 153. The tube 153 is connected to the upper ends of the levers or arms 137 by use of ball and socket connections 169, details of which are best shown in Figs. 6 and 7.

Each connection 169 comprises a ball member 170 slidable on an end portion 171 of the tube 153, there being a stop 172 on the end of a tube 153 to limit outward movement of the ball member 170. This ball member is received in a split socket comprised of a base portion 173 welded at the upper end of plates 136 and a cap portion 174 which is secured to the base portion 173 by means of bolts 175. The ball member may have a projection 176 which extends down into an opening 177 in the base member 173, the purpose of this projection 176 being to prevent rotation of the ball member 170, but permitting oscillation thereof in the socket as the angle of the tube 153 changes as a result of the raising and lowering of the tread elements 21.

The levers 124, to which the sheaves 150 are connected, form part of a sensitive equalizer 115 which is mounted on the rear portion of the upper face of the cross-member 30, as best shown in Figs. 1 and 2. The equalizer comprises a central link 116, fulcrumed at its center by means of a pin 117 supported by webs 118 which project upward from the central portion 31 of the cross-member 30. The ends 119 of the member 115 are bent rearwardly at a relatively small angle, and pins 120 therein are connected by links 121 with pins 122 carried at the inner ends 123 of the levers 124 which are referred to as the outer levers. These levers 124 are fulcrumed on the pins 125 carried by plates 126 which project upwardly from the rearwardly sloping side portions 32 of the cross-member 30. The pins 125 are positioned near the inner ends 123 of the levers 124 so that the outer end 127 of the levers 124 will swing through a greater distance, for a given arc of rotation, than will the inner ends 123 thereof.

The depending cable loops 148 and 155 cooperate with the laterally extending portion 154 of the cable to form an equalizing means to compensate for vertical movement of the supports 92 which are mounted on the tread elements 21. The equalizing means 115 is connected in parallel with the equalizing means represented by the cable, and is much more sensitive in its response to changes in the vertical positions of the supports 92 than is the cable equalizing means. Any sudden change in vertical position of either of the sheaves 150 results in a substantially instantaneous readjustment of the positions of the levers 124 and 116 so that the static load represented by the thrust member 27 and the pusher blade 28 carried thereby is substantially constantly equally divided between the supports 92 and in a like manner carried through the respective tread elements 21 to the ground.

In Figs. 3, 4, and 5, all of the details of the attachment are the same as those described relative to Figs. 1 and 2, with the exception that in Figs. 3 and 4 the mechanical equalizer 115, the sheaves 150, and the connecting parts shown therewith are omitted. The cable loops 148 and 155 are carried down under sheaves 175, Figs. 3, 4, and 9, which are mounted near the ends of the cross-member 30 on pins 176 which pass through plates 177 welded to the sloping portions 131 in upwardly projecting position. In this form of the invention, the cable constitutes the sole means for equalizing the transmission of the load from the thrust member 27 to the support 92 and thence to the tread elements 21.

In Figs. 12 and 13, I show a side arm 29 with an extension 70 secured in a position to hold a pusher blade 28 in lateral position, as in Fig. 1, by a clamping means 72 of the form previously disclosed and by an alternative form of clamping means 73a to replace the previously disclosed clamping means 73. This clamping means 73a includes a plate 187 welded to the upper wall of the extension 70 so as to project inwardly over the upper face of the side arm 29. The plate 187 carries a collar 82, and when the extension 70 is in the forwardly diverging relation to the side arm 29, as shown in Fig. 12, and which position of the extension 70 is necessary to support the pusher blade in laterally extending position, a screw member 74 may be passed through the collar 82 of the plate 187 into a threaded member 79 of the type shown in detail in Fig. 10. In the use of this form of clamping means, the extension 70 is rigidly held at two spaced points by a securing means 72 and a securing means 72a.

I claim as my invention:

1. In an attachment for use with a tractor of the character described, the combination of: a thrust member comprising a pair of side arms to extend along the side of the tractor and a cross-member connected to the front portions of said side arms so as to extend across the front of the tractor, there being pivotal means for connecting said side arms to the tractor; a pusher blade connected to said cross-member so as to be swung from a lateral position to an angled position; an extension extending forwardly from one of said side arms to engage and rigidly hold said pusher blade; and means disposed at spaced points along said extension and said side arm to rigidly clamp said extension to said side arm in different positions of projection thereof relative to said side arm corresponding to the different positions of said pusher blade, whereby said pusher blade may be rigidly secured to said thrust member in all of its different positions.

2. In an attachment for use with a tractor of the character described, the combination of: a thrust member comprising a pair of side arms to extend along the side of the tractor and a cross-member connected to the front portions of said side arms so as to extend across the front of the tractor, there being pivotal means for connecting said side arms to the tractor; a pusher blade connected to said cross-member so as to be swung from a lateral position to an angled position; and means to rigidly secure the end portions of said pusher blade to said thrust member in either of said positions thereof, said securing means comprising an extension along one of said side arms and having the front end thereof connected to said pusher blade, said extension having a pair of spaced openings therethrough formed by walls which taper toward said side arm, and a pair of clamping screws threaded through said openings into said side arm, said clamping screws having heads to seat tightly in said openings and engaging said tapered walls.

3. In an attachment for use with a tractor of the character described, the combination of: a thrust member comprising a pair of side arms to extend along the side of the tractor and a cross-member connected to the front portions of said side arms so as to extend across the front of the tractor, there being pivotal means for connecting said side arms to the tractor; a pusher blade connected to said cross-member so as to be swung from a lateral position to an angled position; and means to rigidly secure the end portions of said pusher blade to said thrust member in either of said positions thereof, said securing means comprising an extension slidable along one of said side arms and having the front end thereof connected to said pusher blade, said extension having a pair of spaced bodies to engage said side arm, there being an opening through each of said bodies with a tapered seat, walls forming a part of said side arm and having threaded openings therein spaced to correspond to the spacing of said openings of said bodies and being of smaller diameter than said openings of said bodies, clamping screws to pass through said openings of said bodies into engagement with said threaded openings, the threaded shanks of said screws being of materially smaller diameter than said openings, and said clamping screws having tapered heads to fit tightly in said tapered seats of said openings of said bodies and centralize said openings of said bodies with said threaded openings of said side arm.

4. In an attachment for use with a tractor of the character described, the combination of a thrust member comprising a pair of side arms to extend along the sides of the tractor and a cross-member connecting the forward portions of said side arms and extending across the front of the tractor; a pusher blade having a rearwardly facing channel extending longitudinally across the rear of said pusher blade from a point adjacent one end thereof to a point adjacent the other end thereof; means pivotally connecting the central portion of said pusher blade to said cross-member so that it may be swung from lateral position to angled position wherein a portion of said cross-member will lie in said channel and so that it may be rotated relative to an axis extending substantially longitudinally of said tractor to vary the pitch of the pusher blade; extensions securable to said side arms and to the end portions of said pusher blade, there being means for securing said extensions rigidly to said side arms in selected positions of forward projection so as to hold said pusher blade in lateral or angled position, and there being means rigidly securing said extensions to the end portions of said pusher blade in selected vertically spaced positions to hold said blade in pitched position or in horizontal position; means for connecting said thrust member to said tractor; and means for raising and lowering said thrust member.

FRANK P. LAWLER.